US012326776B2

(12) United States Patent
Pachamuthu et al.

(10) Patent No.: US 12,326,776 B2
(45) Date of Patent: Jun. 10, 2025

(54) COMPUTING SYSTEMS AND METHODS FOR CREATING AND EXECUTING USER-DEFINED ANOMALY DETECTION RULES AND GENERATING NOTIFICATIONS FOR DETECTED ANOMALIES

(71) Applicant: Discover Financial Services, Riverwoods, IL (US)

(72) Inventors: Dhineshkumar Pachamuthu, Frisco, TX (US); Abdul Nafeez Mohammad, Chicago, IL (US); Vivek Mathew, Schaumburg, IL (US); Sara Bonefas, Chicago, IL (US); Brendan Sturm, Chicago, IL (US)

(73) Assignee: Discover Financial Services, Riverwoods, IL (US)

( * ) Notice: Subject to any disclaimer, the term of this patent is extended or adjusted under 35 U.S.C. 154(b) by 0 days.

(21) Appl. No.: 18/426,181

(22) Filed: Jan. 29, 2024

(65) Prior Publication Data

US 2024/0168839 A1 May 23, 2024

Related U.S. Application Data

(63) Continuation of application No. 17/581,546, filed on Jan. 21, 2022, now Pat. No. 11,886,278.

(51) Int. Cl.
*G06F 11/00* (2006.01)
*G06F 11/07* (2006.01)
(Continued)

(52) U.S. Cl.
CPC ...... *G06F 11/0784* (2013.01); *G06F 11/0727* (2013.01); *G06F 16/2358* (2019.01); *G06F 16/24568* (2019.01)

(58) Field of Classification Search
CPC ............ G06F 11/0784; G06F 11/0751; G06F 11/0769; G06F 11/0754; G06F 11/3452;
(Continued)

(56) References Cited

U.S. PATENT DOCUMENTS 9,223,673 B1 12/2015 Shamis et al.
11,620,541 B1 4/2023 Ghosh et al.
(Continued)

FOREIGN PATENT DOCUMENTS

KR 10-2006-0017767 A 2/2006

OTHER PUBLICATIONS

Kafka Streams and ksqlDB, Apr. 9, 2020, docs.ksqldb.io/en/0.7.1-ksqldb/concepts/ksqldb-and-kafka-streams/ (Year: 2020).*
(Continued)

*Primary Examiner* — Marc Duncan
(74) *Attorney, Agent, or Firm* — Lee Sullivan Shea & Smith LLP

(57) ABSTRACT

A computing platform may be installed with software technology for creating and executing user-defined anomaly detection rules that configures the computing platform to: (1) receive, from a client device, data defining a given anomaly detection rule that has been created by a user, wherein the given anomaly detection rule comprises at least one anomaly condition that is to be applied to at least one streaming event queue, (2) store a data representation of the given anomaly detection rule in a data store, (3) convert the data representation of the given anomaly detection rule to a streaming query statement, (4) iteratively apply the streaming query statement to the at least one streaming event queue, and (5) while iteratively applying the streaming query statement, make at least one determination that the at least one anomaly condition is satisfied and then cause at least one anomaly notification to be issued to the user.

20 Claims, 9 Drawing Sheets

(51) Int. Cl.
*G06F 16/23* (2019.01)
*G06F 16/2455* (2019.01)

(58) Field of Classification Search
CPC ........... G06F 16/24568; G06F 16/2358; H04L 41/22; H04L 41/0681; H04L 41/06; H04L 41/0604; H04L 41/50; H04L 41/5067
See application file for complete search history.

(56) References Cited

U.S. PATENT DOCUMENTS

| | | | | |
|---|---|---|---|---|
| 11,757,959 | B2* | 9/2023 | Trocki | H04L 65/61 709/219 |
| 11,886,278 | B2* | 1/2024 | Pachamuthu | G06F 16/24568 |
| 2008/0243524 | A1 | 10/2008 | Agrawal et al. | |
| 2011/0184878 | A1 | 7/2011 | Hoefelmeyer | |
| 2011/0271146 | A1 | 11/2011 | Mork et al. | |
| 2015/0172293 | A1 | 6/2015 | Bittner et al. | |
| 2016/0098402 | A1 | 4/2016 | Filippi et al. | |
| 2016/0103838 | A1 | 4/2016 | Sainani et al. | |
| 2017/0192872 | A1 | 7/2017 | Awad et al. | |
| 2020/0285514 | A1 | 9/2020 | Ghare et al. | |
| 2021/0209159 | A1 | 7/2021 | Mahanta et al. | |

OTHER PUBLICATIONS

Ksqldb, Apr. 21, 2020, docs.ksqldb.io/en/0.8.1-ksqldb/ (Year: 2020).*
International Search Report and Written Opinion issued in International Application No. PCT/US2022/053119, mailed on Apr. 28, 2023, 9 pages.
Narkhede, Neha. KSQL—Streaming SQL for Apache Kafka. Aug. 28, 2017, pp. 7 [online], [retrieved on Nov. 5, 2021]. Retrieved from the Internet <URL: https://www.confluent.io/blog/ksql-streaming-sql-for-apache-kafka/>.
Karuthakantakath, Ajmal. Anomaly Detection with Kafka Streams. Big Data Zone, Tutorial, Oct. 17, 2017, pp. 5 [online], [retrieved on Nov. 8, 2021]. Retrieved from the Internet <URL: https://dzone.com/articles/highly-scalable-resilient-real-time-monitoring-cep>.
Event-Driven Microservice. ksqlDB Documentation. Mar. 3, 2021, pp. 16 [online], [retrieved on Nov. 8, 2021]. Retrieved from the Internet <URL:https://docs.ksqldb.io/en/latest/tutorials/event-driven-microservice/>.
Anomaly Detection Using ksqlDB. Kafka Tutorials. pp. 9 [online], [retrieved on Nov. 8, 2021]. Retrieved from the Internet <URL:https://kafka-tutorials.confluent.io/anomaly-detection/ksql.html#group-events-by-time-intervals>.
Chakraboty, Swarnava. Failure detection and alert from real-time data flow using Kafka and KSQL. Fastforward.blog, Mar. 3, 2020, pp. 13 [online], [retrieved on Nov. 8, 2021]. Retrieved from the Internet <URL: fastnforward.blog/failure-detection-and-alert-from-real-time-data-flow-using-kafka-and-ksql-2/>.
Seymour, Mitch. Mastering Kafka Streams and ksqlDB. Building Real-Time Data Systems by Example, Extracted Pages. O'Reilly, Feb. 4, 2021, pp. 11 [online], [retrieved on Nov. 8, 2021]. Retrieved from the Internet <URL: https://assets.confluent.io/m/7997a914c1a19b5_ga=2.76219664.466152132.1636132860-849708562.1636132860&_gac=1.208348838.1636133738.EAlalQobChMlnZas5d2B9AIVUW5vBB3giAB9EAAYASADEgJnk_D_BwE>.
"KSQL Use Cases. Level Up your KSQL by Confluent", YouTube, https://www.youtube.com/watch?v=euz0isNG1SQ&t=6s, May 1, 2018, 1 page.

* cited by examiner

Step 1. Add New Rule – Basic Information

Rule Name
RULE_1234

Description
monitor Queue_123456A

Alert Subscribers  Please only add employees who you know have access to the anomaly detection application.
Select users or enter an email address

FIG. 4A

Step 2. Add New Rule with Conditions

Conditional Relationship: Match ALL Conditions ▾

Time Window Length: 30 min ▾

% Threshold: > 20 ⓘ

+ Add Filter

Streaming Event Queue: Queue_123456A ▾

Data Field: ORGANIZATION_NAME ▾

Detection Value: = DISCOVER + ▦

Streaming Event Queue: *Select Queue* ▾

Data Field: *Select Data Field* ▾
- BAL
- CASH_BAL
- CASH_LIMIT
- CLIENT_LIMIT
- CREDIT_LIMIT
- DELQ_DAYS
- OPEN_TO_BUY
- SEG_ID_VERSION
- ACCT_NUMBER Detection Value: *Select Operator* ▾ *Enter Value* + ▦

[Back]  [Next]

◻ User1  [+ Add New Rule]  [◀ Announcements]  [? Help]  [⇥ Logout]

View Rule

Rule Name
RULE_1234

Rule Description
monitor Queue_123456A

Time Window Length
30 minutes

Alert Subscribers
User2, User3

% Threshold
>20%

[Conditions] | [Filter(s)]

Conditional Relationship
Match ALL Conditions

Streaming Event Queue                         Data Field           Value
Queue_123456A                                     ORGANIZATION_NAME        = DISCOVER

Anomalies
Time of Alert ⌄                     Status        Detection
9/26/2021, 5:03:29 AM               Create Ticket     Details
9/9/2021, 1:03:20 AM                Create Ticket     Details

Owner
User1

[Back]

FIG. 4C

COMPUTING SYSTEMS AND METHODS FOR CREATING AND EXECUTING USER-DEFINED ANOMALY DETECTION RULES AND GENERATING NOTIFICATIONS FOR DETECTED ANOMALIES

CROSS-REFERENCE TO RELATED APPLICATIONS

This application claims priority to, and is a continuation of, U.S. patent application Ser. No. 17/581,546 filed on Jan. 21, 2022 and entitled "Computing Systems and Methods for Creating and Executing User-Defined Anomaly Detection Rules and Generating Notifications for Detected Anomalies," the contents of which are incorporated herein by reference in their entirety.

BACKGROUND

Organizations in many different industries have begun to operate computing platforms that are configured to ingest, process, analyze, generate, store, and/or output data that is relevant to the businesses of those organizations. Such computing platforms are often referred to as "data platforms." For example, a financial institution may operate a data platform that is configured to ingest, process, analyze, generate, store, and/or output data related to the financial institution's customers and their financial accounts, such as financial transactions data (among other types of data that may be relevant to the financial institution's business). As another example, an organization interested in monitoring the state and/or operation of physical objects such as industrial machines, transport vehicles, and/or other Internet-of-Things (IoT) devices may operate a data platform that is configured to ingest, process, analyze, generate, store, and/or output data related to those physical objects of interest. As another example, a provider of a Software-as-a-Service (SaaS) application may operate a data platform that is configured to ingest, process, analyze, generate, store, and/or output data that is created in connection with that SaaS application. Many other examples are possible as well.

Data platforms such as these may provide several benefits to organizations, including but not limited to enabling organizations to achieve efficiencies in data management and analysis and enabling organizations to unlock the value of their data in ways not previously possible, which may lead to more informed business decisions and new business opportunities. Data platforms may provide various other advantages as well.

Overview

Disclosed herein is new software technology for creating and executing user-defined rules for detecting anomalies in data that is ingested and/or generated by a computing platform.

In one aspect, the disclosed technology may take the form of a method to be carried out by a computing platform that involves (1) causing a client device associated with a user to present an interface for creating an anomaly detection rule, (2) receiving, from the client device, data defining a given anomaly detection rule that has been created by the user via the interface, wherein the given anomaly detection rule comprises at least one anomaly condition that is to be applied to at least one streaming event queue, (3) storing a data representation of the given anomaly detection rule in a data store, (4) retrieving the data representation of the given anomaly detection rule from the data store, (5) converting the data representation of the given anomaly detection rule to a streaming query statement, (6) iteratively applying the streaming query statement to the at least one streaming event queue, (7) while iteratively applying the streaming query statement to the at least one streaming event queue, making at least one determination that the at least one anomaly condition is satisfied, and (8) based on the at least one determination, causing at least one anomaly notification to be issued to the user.

The at least one anomaly condition may take various forms, and in some example embodiments, may comprise parameters that define (i) a subset of streaming events within the at least one streaming event queue on which data analysis is to be performed, (ii) one or more data fields of the subset of streaming events on which data analysis is to be performed, and (iii) a form of data analysis that is to be performed on values of one or more data fields of the subset of streaming events. Further, as examples, the at least one anomaly condition may comprise an evaluation of whether an extent of a given subset of streaming events that contain a given value of a given data field satisfies a threshold extent, an evaluation of whether a total or average value of a numerical data field across a given subset of streaming events satisfies a threshold value, or an evaluation of whether certain data values across given subsets of streaming events from two or more streaming event queues that have a particular relationship meet a certain threshold criteria.

In some example embodiments, the given anomaly detection rule may additionally comprise at least one filter that is to be applied to the at least one streaming event queue before the at least one anomaly condition is applied.

Further, in some example embodiments, the method may additionally involve, before causing the client device to present the interface, determining a set of user-selectable options that are to be included in the interface for creating the anomaly detection rule. In this respect, the set of user-selectable options may be based on information obtained from a schema registry associated with available streaming event queues and/or may be based on permissions information associated with the user.

Further yet, in some example embodiments, the function of causing the at least one anomaly notification to be issued to the user may involve (i) generating an anomaly event, (ii) writing the generated anomaly event to a given streaming event queue that is designated for anomaly events, and (iii) based on the anomaly event and the data representation of the given anomaly detection rule, generate a notification that is to be issued to the user.

Still further, in some example embodiments, the method may additionally involve (i) detecting a request to update a schema that is being maintained for the at least one streaming event queue, (ii) determining that the request to update the schema involves removal of a data field, and (iii) based on determining that the request to update the schema involves removal of the data field, declining to update the schema.

In another aspect, disclosed herein is a computing platform that includes a network interface, at least one processor, at least one non-transitory computer-readable medium, and program instructions stored on the at least one non-transitory computer-readable medium that are executable by the at least one processor to cause the computing platform to carry out the functions disclosed herein, including but not limited to the functions of the foregoing method.

In yet another aspect, disclosed herein is a non-transitory computer-readable medium provisioned with program instructions that, when executed by at least one processor, cause a computing platform to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIGS. 4A-4C depict example views of an example user interface that may be provided by the example computing platform of FIG. 2 to carry out one or more functions in accordance with the disclosed technology.

Figure 1:
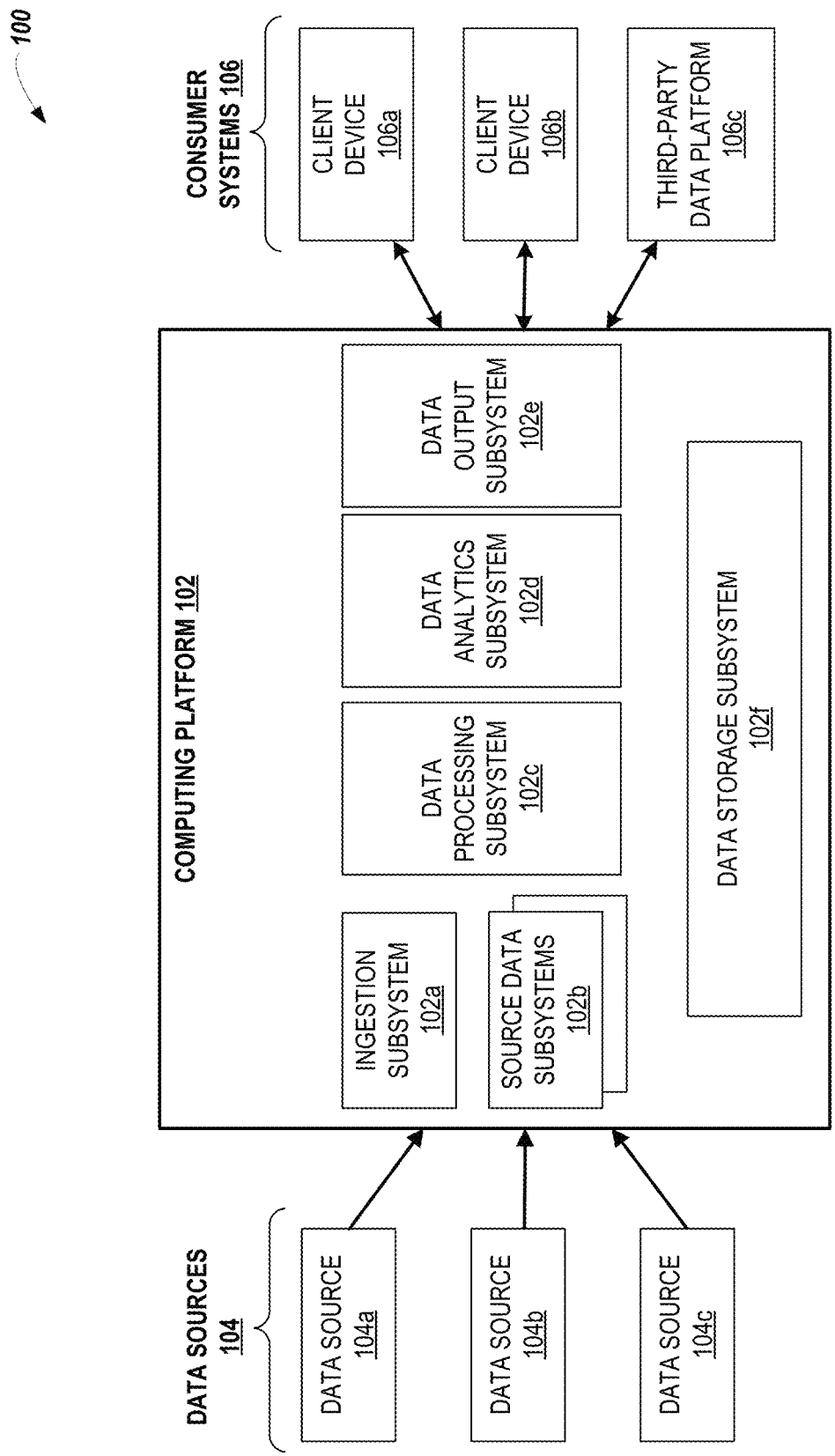
FIG. 1 depicts an example network configuration including an example computing platform operated by a financial institution.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

As noted above, organizations in many different industries have begun to operate computing platforms that are configured to ingest, process, analyze, generate, store, and/or output data that is relevant to the businesses of those organizations. Such computing platforms are often referred to as "data platforms." For example, a financial institution may operate a data platform that is configured to ingest, process, analyze, generate, store, and/or output data related to the financial institution's customers and their financial accounts, such as financial transactions data (among other types of data that may be relevant to the financial institution's business). As another example, an organization interested in monitoring the state and/or operation of physical objects such as industrial machines, transport vehicles, and/or other Internet-of-Things (IoT) devices may operate a data platform that is configured to ingest, process, analyze, generate, store, and/or output data related to those physical objects of interest. As another example, a provider of a Software-as-a-Service (SaaS) application may operate a data platform that is configured to ingest, process, analyze, generate, store, and/or output data that is created in connection with that SaaS application. Many other examples are possible as well.

To illustrate with an example, FIG. 1 depicts a network environment 100 that includes at its core an example computing platform 102 that serves as a data platform for an organization, which may comprise a collection of functional subsystems that are each configured to perform certain functions in order to facilitate tasks such as data ingestion, data generation, data processing, data analytics, data storage, and/or data output. These functional subsystems may take various forms.

For instance, as shown in FIG. 1, the example computing platform 102 may comprise an ingestion subsystem 102a that is generally configured to ingest source data from a particular set of data sources 104, such as the three representative data sources 104a, 104b, and 104c shown in FIG. 1, over respective communication paths. These data sources 104 may take any of various forms, which may depend at least in part on the type of organization operating the example computing platform 102. For example, if the example computing platform 102 comprises a data platform operated by a financial institution, the data sources 104 may comprise computing devices and/or systems that generate and output data related to the financial institution's customers and their financial accounts, such as financial transactions data (e.g., purchase and/or sales data, payments data, transfers data, withdrawals data, etc.), customer identification data (e.g., name, address, social security number, phone number, email address, etc.), customer interaction data (e.g., web-based interactions with the financial institution such as logins, webpage visits, etc.), user account data, and/or credit history data, among various other possibilities. In this respect, the data sources that generate and output such data may take the form of payment processors, merchant service provider systems such as payment gateways, point-of-sale (POS) terminals, automated teller machines (ATMs), computing systems at brick-and-mortar branches of the financial institution, and/or computing devices associated with customers (e.g., personal computers, smartphones, tablets, etc.), among various other possibilities. The data sources 104 may take various other forms as well.

Further, as shown in FIG. 1, the example computing platform 102 may comprise one or more source data subsystems 102b that are configured to internally generate and output source data that is consumed by the example computing platform 102. These source data subsystems 102b may take any of various forms, which may depend at least in part on the type of organization operating the example computing platform 102. For example, if the example computing platform 102 comprises a data platform operated by a financial institution, the one or more source data subsystems 102b may comprise functional subsystems that internally generate and output certain types of data related to customer accounts (e.g., account balance data, payment schedule data, etc.). The one or more source data subsystems 102b may take various other forms as well.

Further yet, as shown in FIG. 1, the example computing platform 102 may comprise a data processing subsystem 102c that is configured to carry out certain types of processing operations on the source data. These processing operations could take any of various forms, including but not limited to data preparation, transformation, and/or integration operations such as validation, cleansing, deduplication, filtering, aggregation, summarization, enrichment, restructuring, reformatting, translation, mapping, etc.

Still further, as shown in FIG. 1, the example computing platform 102 may comprise a data analytics subsystem 102d that is configured to carry out certain types of data analytics operations based on the processed data in order to derive insights, which may depend at least in part on the type of organization operating the example computing platform 102. For example, if the example computing platform 102 comprises a data platform operated by a financial institution, the data analytics subsystem 102*d* may be configured to carry out data analytics operations in order to derive certain types of insights that are relevant to the financial institution's business, examples of which could include, analyses of transactional history on a customer's account, predictions of fraud or other suspicious activity on a customer's account, and predictions of whether to extend credit to an existing or prospective customer, among other possibilities. The data analytics subsystem 102*d* may be configured to carry out any of numerous other types of data analytics operations as well.

Moreover, the data analytics operations carried out by the data analytics subsystem 102*d* may be embodied in any of various forms. As one possibility, a data analytics operation may be embodied in the form of a user-defined rule (or set of rules) that is applied to a particular subset of the processed data in order to derive insights from that processed data. As another possibility, a data analytics operation may be embodied in the form of a data science model that is applied to a particular subset of the processed data in order to derive insights from that processed data. In practice, such a data science model may comprise a machine learning model that has been created by applying one or more machine learning techniques to a set of training data, but data science models for performing data analytics operations could take other forms and be created in other manners as well. The data analytics operations carried out by the data analytics subsystem 102*d* may be embodied in other forms as well.

Referring again to FIG. 1, the example computing platform 102 may also comprise a data output subsystem 102*e* that is configured to output data (e.g., processed data and/or derived insights) to certain consumer systems 106 over respective communication paths. These consumer systems 106 may take any of various forms.

For instance, as one possibility, the data output subsystem 102*e* may be configured to output certain data to client devices that are running software applications for accessing and interacting with the example computing platform 102, such as the two representative client devices 106*a* and 106*b* shown in FIG. 1, each of which may take the form of a desktop computer, a laptop, a netbook, a tablet, a smartphone, or a personal digital assistant (PDA), among other possibilities. These client devices may be associated with any of various different types of users, examples of which may include individuals that work for or with the organization operating the example computing platform 102 (e.g., employees, contractors, etc.) and/or customers of the organization operating the example computing platform 102. Further, the software applications for accessing and interacting with the example computing platform 102 that run on these client devices may take any of various forms, which may depend at least in part on the type of user and the type of organization operating the example computing platform 102. In some instances, the client devices 106*a* and 106*b* may also serve as data sources for providing source data to the computing platform 102. For instance, the client devices 106*a* and 106*b* may be computing devices which can be accessed by users of the computing platform 102 to input information that is then provided to the computing platform 102 by the client devices in the form of customer identification data (e.g., name, address, social security number, phone number, email address, etc.) or customer interaction data (e.g., web-based interactions with the financial institution such as logins, webpage visits, etc.), among other examples. As another possibility, the data output subsystem 102*e* may also be configured to output certain data to third-party data platforms, such as the representative third-party data platform 106*c* shown in FIG. 1.

In order to facilitate this functionality for outputting data to the consumer systems 106, the data output subsystem 102*e* may comprise one or more Application Programming Interface (APIs) that can be used to interact with and output certain data to the consumer systems 106 over a data network, and perhaps also an application service subsystem that is configured to drive the software applications running on the client devices, among other possibilities.

The data output subsystem 102*e* may be configured to output data to other types of consumer systems 106 as well.

Referring once more to FIG. 1, the example computing platform 102 may also comprise a data storage subsystem 102*f* that is configured to store all of the different data within the example computing platform 102, including but not limited to the source data, the processed data, and the derived insights. In practice, this data storage subsystem 102*f* may comprise several different data stores that are configured to store different categories of data. For instance, although not shown in FIG. 1, this data storage subsystem 102*f* may comprise one set of data stores for storing source data and another set of data stores for storing processed data and derived insights. However, the data storage subsystem 102*f* may be structured in various other manners as well. Further, the data stores within the data storage subsystem 102*f* could take any of various forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System), object-based data stores (e.g., Amazon S3), data warehouses (which could be based on one or more of the foregoing types of data stores), data lakes (which could be based on one or more of the foregoing types of data stores), and/or message queues, among other possibilities.

The example computing platform 102 may comprise various other functional subsystems and take various other forms as well.

In practice, the example computing platform 102 may generally comprise some set of physical computing resources (e.g., processors, data storage, etc.) that are utilized to implement the functional subsystems discussed herein. This set of physical computing resources take any of various forms. As one possibility, the computing platform 102 may comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, the example computing platform 102 may comprise "on-premises" computing resources of the organization that operates the example computing platform 102 (e.g., organization-owned servers). As yet another possibility, the example computing platform 102 may comprise a combination of cloud computing resources and on-premises computing resources. Other implementations of the example computing platform 102 are possible as well.

Further, in practice, the functional subsystems of the example computing platform 102 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

As noted above, the example computing platform 102 may be configured to interact with the data sources 104 and consumer systems 106 over respective communication paths. Each of these communication paths may generally comprise one or more data networks and/or data links, which may take any of various forms. For instance, each respective communication path with the example computing platform 102 may include any one or more of point-to-point data links, Personal Area Networks (PANs), Local Area Networks (LANs), Wide Area Networks (WANs) such as the Internet or cellular networks, and/or cloud networks, among other possibilities. Further, the data networks and/or links that make up each respective communication path may be wireless, wired, or some combination thereof, and may carry data according to any of various different communication protocols. Although not shown, the respective communication paths may also include one or more intermediate systems, examples of which may include a data aggregation system and host server, among other possibilities. Many other configurations are also possible.

It should be understood that network environment 100 is one example of a network environment in which a data platform may be operated, and that numerous other examples of network environments, data platforms, data sources, and consumer systems are possible as well.

In a data platform such as the one described above, certain source data that is ingested and/or generated by the data platform may begin to deviate from "normal" or "expected" behavior as a result of some problem that may require further attention by the organization operating the data platform and/or by some other third-party organization. For example, certain source data that is ingested and/or generated by a data platform being operated by an organization in any industry could begin to deviate from normal or expected behavior as a result of a cybersecurity problem or a computing infrastructure problem that requires further attention by the organization and/or its cloud infrastructure provider. As another example, certain source data that is ingested and/or generated by a data platform being operated by a financial institution could begin to deviate from normal or expected behavior as a result of fraud or other problematic financial activity that requires further attention by the financial institution. As yet another example, certain source data that is ingested and/or generated by a data platform being operated by an organization responsible for managing a fleet of industrial machines could begin to deviate from normal or expected behavior as a result of a malfunction or failure at a particular industrial machine that requires further attention by the organization. Many other examples are possible as well. This deviation from normal or expected behavior may be referred to herein as "anomalous" behavior, or more simply, an "anomaly."

As will be appreciated, the types of problems that underlie these anomalies could lead to a host of negative consequences if they are not discovered and addressed in a timely manner. For example, a cybersecurity or computing infrastructure problem at a data platform that is not discovered and addressed in a timely manner could lead to platform downtime, loss of data, and/or unauthorized access to sensitive information, which may negatively impact both the users of that data platform and the organization operating the data platform (e.g., by exposing the organization to financial and/or legal consequences). As another example, if a customer of a financial institution has been the victim of fraudulent activity that is not discovered and addressed in a timely manner, this could negatively impact both the customer and the financial institution (e.g., by exposing the financial institution to financial consequences such as covering financial losses resulting from the fraud). As yet another example, if an industrial machine experiences a malfunction or failure that is not discovered and addressed in a timely manner, this could lead to costly downtime and perhaps also safety issues, which negatively impact the organization responsible for managing the industrial machine as well as any individuals responsible for operating the industrial machine. Many other examples are possible as well.

For these reasons, technology has been developed for detecting anomalies in data that is ingested and/or generated by a data platform. However, this existing technology for detecting anomalies has a number of limitations and drawbacks. For instance, existing anomaly detection technology typically evaluates the data that is ingested and/or generated by a data platform for anomalies in a batch fashion using cron jobs, scripts, or the like, which introduces an undesirable lag between the time when data first begins to exhibit anomalous behavior and the time when that anomalous behavior is actually detected that could span hours or even days depending on the frequency of the batch processing. This lag in turn increases the time it takes for an organization to recognize and address the problem underlying the anomalous behavior, which may increase the exposure of the organization and its customers to the types of negative consequences discussed above.

Moreover, existing anomaly detection technology is designed for use by a limited class of technical users who have familiarity with writing code for anomaly detection, such data scientists and platform developers, and as a result, such technology lacks any sort of intuitive, user-friendly means for configuring, implementing, and/or managing the anomaly-detection rules that are to be applied to the data that is ingested and/or generated by a data platform. This degrades user experience and makes the tasks of configuring, implementing, and/or managing anomaly-detection rules more cumbersome and time consuming.

To address these and other problems with the existing anomaly detection technology, disclosed herein is new software technology that enables creation and execution of user-defined rules for detecting anomalies in data that is ingested and/or generated by a computing platform. At a high level, the disclosed software technology may function to (i) provide a user-friendly interface that facilitates building one or more user-defined rules for detecting anomalies, (ii) iteratively apply the one or more user-defined anomaly detection rules to streaming events produced based on data that is ingested and/or generated by the computing platform, which may enable the computing platform to detect anomalies in a nearly continuous, real-time fashion, and (iii) when anomalies are detected, automatically generate and issue targeted notifications to users based on the user-defined rules. In this way, the disclosed technology may provide a near real-time anomaly detection automated response system, which may be referred to as a "READAR" system for short.

In practice, the software technology disclosed herein may be implemented by a set of functional subsystems that are hosted by a computing platform, such as the computing platform 102 of FIG. 1. (It should be understood that each of the functional subsystems for implementing the disclosed software technology either could be a subsystem of one of higher-level functional subsystems described and shown with reference to FIG. 1 or could be separate from those higher-level functional subsystems). In the examples and discussion below, the disclosed software technology may at times be described in the context of a computing platform 102 that is operated by a financial institution, but it should be understood that the disclosed software technology may be utilizes by computing platforms operated by organizations in various other industries as well.

Figure 2:
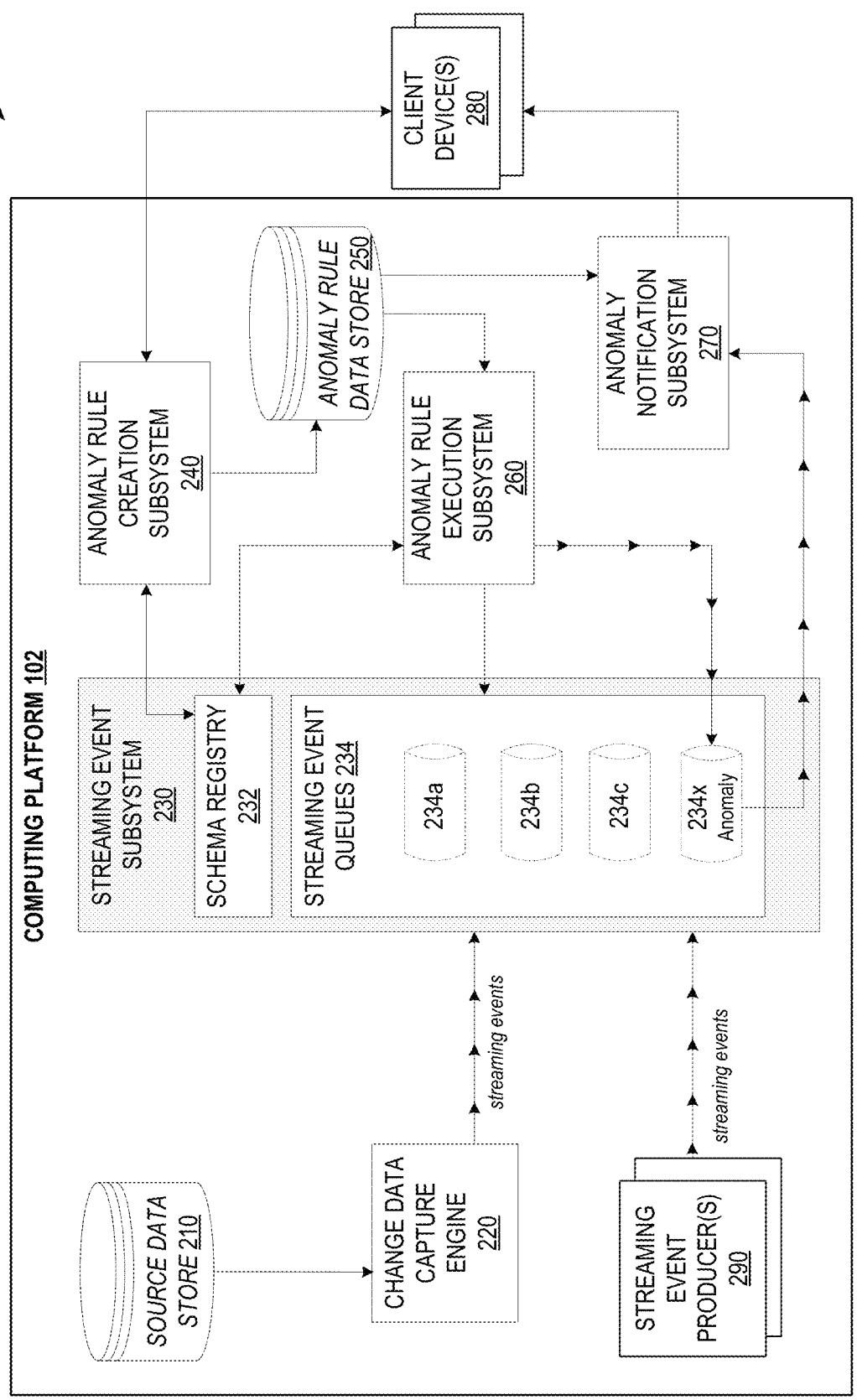
FIG. 2 depicts an example computing platform that has been configured to host example software subsystems in accordance with the disclosed technology.

One example implementation of the software technology described herein is illustrated in FIG. 2, which shows that the computing platform 102 of FIG. 1 may be configured to include an example set of functional subsystems that may work together to carry out the disclosed anomaly detection functionality. Although not shown, it should be understood computing platform 102 of FIG. 2 may include the higher-level functional subsystems that are described and shown with reference to FIG. 1. Further, it should be understood that each of the functional subsystems described and shown with reference to FIG. 2 either could be a subsystem of one of the higher-level functional subsystems described and shown with reference to FIG. 1 or could be separate from those higher-level functional subsystems.

As shown in FIG. 2, the computing platform 102 may include a source data store 210, which may be utilized to store source data that has been ingested from external data sources (e.g., data sources 104) and/or generated by other subsystems of the computing platform 102. The data that is stored in the source data store 210 may take various forms, which may depend at least in part on the type of organization operating the example computing platform 102. For instance, if the example computing platform 102 comprises a data platform operated by a financial institution, the source data store 210 may store data related to the financial institution's customers and their financial accounts, such as financial transactions data (e.g., purchase and/or sales data, payments data, etc.), customer identification data (e.g., name, address, social security number, email address, phone number, etc.), customer interaction data (e.g., web-based interactions with the financial institution such as logins and webpage activity, etc.), and/or credit history data, among various other possibilities. However, it should be understood that the data stored in the source data store 210 may take various other forms as well. Further, it should be understood that, in practice, the source data store 210 may comprise multiple separate data stores that collectively make up the storage repository for the source data within the computing platform 102.

In line with the discussion above, the computing platform 102 may then be configured to carry out certain types of processing operations on the source data that is stored in the source data store 210 in order to place the source data in better form for carrying out data analytics operations and deriving insights based the source data. As part of this processing functionality, the computing platform 102 that is configured in accordance with the present disclosure may apply change data capture to the source data store 210, which is a processing operation that generally functions to monitor for and capture certain kinds of changes within a data store.

For instance, as shown in FIG. 2, the computing platform 102 may be configured to include a change data capture engine 220 (or "CDC" engine 220 for short) that is configured to monitor certain datasets stored in the source data store 210 for certain types of changes and then capture each change that is detected in the form of a streaming event that is generated and output by the CDC engine 220 for downstream processing and analysis. In this respect, each streaming event that is generated and output by the CDC engine 220 may comprise data for some defined set of data fields (or "attributes") that correspond to the underlying data in the source data store 210 that led to the change detected by the CDC engine 220.

To illustrate with an example, as noted above, a computing platform 102 operated by a financial institution may be configured to receive and ingest financial transactions data, such as purchase and/or sales data, payments data, etc. Upon receiving new financial transactions data, the computing platform 102 may store it a given table of the source data store 210 as a set of new data records. In turn, the CDC engine 220 of the computing platform 102 may detect that these new data records have been added to the given table of the source data store 210 and then capture these changes by generating and outputting a new streaming event for each new data record that has been added to the given table of source data store 210. In this respect, each streaming event may comprise data for a defined set of fields that correspond to its underlying data record, such as date/time of transaction, type of transaction, amount of transaction, payor name and/or account number, payee name and/or account number, card issuer, etc. Many other examples are possible as well.

In practice, the CDC engine 220 may comprise any software component now known or later developed for performing CDC on a data store, including but not limited to third-party CDC software components such as Qlik Replicate, MongoDB, and Debezium, among others. Further, in practice, the CDC engine 220 may comprise an API or the like that enables configuration of the CDC engine 220, which may involve defining the particular datasets within the source data store 210 (e.g., the particular tables) that are to be monitored by the CDC engine 220, the types of changes that are to be detected by the CDC engine 220, and the structure of the streaming events that are to be generated and output by the CDC engine 220 for each of the different types of detects changes, among other possibilities.

Although not shown in FIG. 2, it should also be understood that the data stored in the source data store 210 may undergo other processing operations before being analyzed by the CDC engine 220, such as any of the processing operations described above.

As shown in FIG. 2, the streaming events that are generated and output by the CDC engine 220 may then be passed to a streaming events subsystem 230 of the computing platform 102, which generally functions to log the streaming events into streaming event queues that may then be read by other functional subsystems of the computing platform 102 in order to facilitate any of various downstream functionalities. In this way, the streaming events subsystem 230 serves as a form of data storage for the streaming events that provides a consolidated view of the streaming events and enables streaming analytics (or sometimes called "stream processing") to be carried out on the streaming events. In practice, the streaming events subsystem 230 may comprise any software technology for queueing streaming events now known or later developed, including but not limited to the Apache Kafka event streaming platform, among others. (In this respect, it should be understood that the "queues" described herein encompass both messaging queues and publish-subscribe ("pub-sub") queues, among other possible architectural patterns for queues.)

As shown in FIG. 2, the streaming events subsystem 230 may comprise a schema registry 232 and a plurality of streaming event queues 234 (e.g., Kafka topics) that are each configured to maintain a respective type of streaming events, of which streaming event queues 234a, 234b, 234c, and 234x are shown as examples. In general, the schema registry 232 may comprise a repository that stores the schemas for the streaming event queues 234 within the streaming events subsystem 230, where each such schema defines the structure of the streaming events that are to be written to a given streaming event queue 234 (e.g., the particular set of data fields that are to be included in the streaming events). In turn, each of the streaming event queues 234 may contain streaming events of the type defined by the schema for that streaming event queue. In this respect, each producer of streaming events within the computing platform 102 (such as the CDC engine 202) may write (or "publish") each produced streaming event to a particular streaming event queue 234 within the streaming events subsystem 230 that corresponds to the type of that streaming event (e.g., a streaming event queue 234 that has been defined to contain streaming event messages of that type).

In line with the discussion above, the streaming events that are written to each of the streaming event queue 234 may comprise data for some defined set of data fields, which could take any of various forms—including but not limited to data fields containing Boolean values, numerical (e.g., integer) values, and/or text string values, among other possibilities. As one example to illustrate, the data fields included within a streaming event for a transaction record received by the computing platform 102 may include data for fields such as date/time of transaction, type of transaction, amount of transaction, payor name and/or account number, payee name and/or account number, and card issuer, among various other possibilities. Additionally, in some implementations, a streaming event could additionally include certain metadata, such as an indicator of the type of streaming event and/or and indication of the date/time when the streaming event data was generated, among other possibilities. Other examples are also possible.

Each schema in the schema registry 232 may be defined in various ways. As one possibility, the streaming events subsystem 230 may be configured to define a schema based on information that is received from another functional subsystem of the computing platform 102 that is configured to write streaming events to the streaming event queues 234 within the streaming events subsystem 230, where such information may specify the structure of the streaming events that are to be written to a given streaming event queue 234. For instance, after the CDC engine 220 is configured to generate a new type of streaming event based on detected changes to the source data store 210, the CDC engine 220 may provide information to the streaming events subsystem 230 specifying the structure of the new type of streaming event that is to be written to the streaming events subsystem 230, and the streaming events subsystem 230 may then use this information to register a schema for a new streaming event queue 234 in the schema registry 232 and then initialize that new streaming event queue 234. The streaming events subsystem 230 may receive comparable information from other functional subsystems of the computing platform 102 as well. As another possibility, the streaming events subsystem 230 may be configured to define a schema based on user input that may be provided by a user's client device through an API of the streaming events subsystem 230, where such information may specify the structure of streaming events that are to be written to a given streaming event queue 234. A schema may be defined by the streaming events subsystem 230 in other manner as well.

After a schema for a given streaming event queue 234 has been defined, it is also possible that the streaming events subsystem 230 may receive information indicating that the structure of the streaming events to be written to the given streaming event queue 234 has changed. For instance, if the CDC engine 220 is re-configured to update the data fields that are to be included in a given type of streaming event (e.g., by adding or removing a data field), the CDC engine 220 may provide information to the streaming events subsystem 230 indicating that the structure of the given type of streaming event has been updated. As another possibility, the streaming events subsystem 230 may receive a request from a user's client device to update the schema of the given streaming event queue 234. Other possibilities may also exist.

In some implementations, the streaming events subsystem 230 may be configured to automatically update the schema of a streaming event queue 234 within the schema registry 232 upon receiving this kind of information. However, in some circumstances, updating the schema of the given streaming event queue 234 within the schema registry 232 could introduce problems with certain downstream subsystems that are serving as consumers of the streaming events within the given streaming event queue 234, such as the anomaly rule execution subsystem 260 described in further detail below. For instance, if a consumer of the streaming events within the given streaming event queue 234 is configured to utilize a certain data field from the streaming events for some purpose, and that data field is removed from the schema for the given streaming event queue 234, this may cause the consumer to malfunction. This malfunction may prevent the consumer from carrying out its intended functionality, and if there are other functional subsystems that are dependent on the functionality of the consumer, this malfunction could also lead to various other downstream problems in the computing platform 102.

To address this problem, disclosed herein is an alternate approach for implementing updates to schemas within a schema registry whereby the streaming events subsystem 230 is configured to selectively determine whether or not to update the schema of a streaming event queue 234 within the schema registry 232 based on the nature of the schema update being sought (and perhaps also other information available to the streaming events subsystem 230) as opposed to simply updating the schema of the streaming event queue 234 by default. For instance, in accordance with this aspect of the present disclosure, the streaming events subsystem 230 may be configured to evaluate whether the schema update being sought involves a removal of a data field. Based on that evaluation, the streaming events subsystem 230 may then selectively determine to either (i) update the schema of the streaming event queue 234 within the schema registry 232 if the update being sought does not involve a removal of a data field or (ii) decline to update the schema of the streaming event queue 234 within the schema registry 232 if the update being sought does involve a removal of a data field. In this respect, if the streaming events subsystem 230 declines to update the schema because it involves a removal of a data field, that data field will remain in the schema of the streaming event queue 234 within the schema registry 232, and going forward, that data field may be assigned a null value when streaming events are written into the streaming event queue 234. To facilitate this functionality, the streaming events subsystem 230 may also store (either in the schema registry 232 or elsewhere) some indication that the data field has been removed from streaming events being generated by the producer and will be assigned a null value going forward when such streaming events are written to the streaming event queue 234.

By selectively implementing updates to schemas for streaming event queues in this way, the streaming events subsystem disclosed herein may avoid the kinds of consumer malfunctions that may otherwise arise when a data field is removed from a schema of a streaming event queue. The benefits of this technology are discussed in further detail below in connection with the anomaly rule execution subsystem 260.

The streaming events subsystem 230 may take various other forms and perform various other functions as well.

In addition to the CDC engine 202, other functional subsystems of the computing platform 102 could also be configured to produce streaming events and write them to the streaming event queues 234 of the streaming events subsystem 230. These functional subsystems are illustrated in FIG. 2 as "Streaming Event Producer(s) 290," and may take any of various forms.

For instance, as one possibility, the Streaming Event Producer(s) 290 may comprise a given user-defined rule or a given data science model that is deployed within the data analytics subsystem 102d of the computing platform 102 and has its outputs encoded into the form of streaming events that are written to a given streaming event queue 234 of the streaming events subsystem 230.

As another possibility, the Streaming Event Producer(s) 290 may comprise a software component of the data processing subsystem 102c (other than the CDC engine 220) that is configured to generate streaming events, which may then be written to a given streaming event queue 234 of the streaming events subsystem 230. For example, the data processing subsystem 102c may comprise a data aggregation engine that is configured to aggregate a particular time-series dataset over time and then output the aggregated values in the form of streaming events that may be written to a given streaming event queue 234 of the streaming events subsystem 230.

As yet another possibility, the Streaming Event Producer(s) 290 may comprise a source data subsystem 102b of the computing platform 102 that is configured to internally generate source data taking the form of streaming events, which may then be written to a given streaming event queue 234 of the streaming events subsystem 230. For example, the computing platform 102 could include a source data subsystem 102b that is configured to monitor the usage or performance of the computing resources of the computing platform 102 (e.g., CPU usage, memory usage, etc.) and then output streaming events based on such monitoring that may be written to a given streaming event queue 234 of the streaming events subsystem 230.

As still another possibility, the source data that is ingested by the ingestion subsystem 102a from a data source 104 may take the form of streaming events, in which case these streaming events may be written to a given streaming event queue 234 of the streaming events subsystem 230.

The streaming events that are written to the streaming event queues 234 of the streaming events subsystem 230 may take various other forms as well.

In accordance with the present disclosure, the computing platform 102 may additionally be configured to host a set of function systems that work together to carry out anomaly detection on the streaming events that are written to the streaming event queues 234 of the streaming events subsystem 230. As shown in FIG. 2, in at least one implementation, these functional subsystems may comprise an anomaly rule creation subsystem 240, an anomaly rule data store 250, an anomaly rule execution subsystem 260, and an anomaly notification subsystem 270. Each of these example functional subsystems will now be described in further detail.

To begin, the anomaly rule creation subsystem 240 may generally be configured to perform functions that facilitate creation of a user-defined rule for detecting anomalies, examples of which may include (i) causing a client device 280 associated with a user to present an interface for creating a user-defined rule for detecting anomalies, (ii) receiving, from the client device 280, data defining a given user-defined rule for detecting anomalies that has been created by the user, and (iii) storing a data representation of the given user-defined rule for detecting anomalies in the anomaly rule data store 250. To facilitate this functionality, the anomaly rule creation subsystem 240 may also provide an API or the like that is accessible by client devices of users that are interested in creating user-defined rules.

Each user-defined anomaly detection rule may comprise various elements, examples of which may include (i) basic information about the rule, (ii) an identification of one or more streaming event queues that are to be evaluated based on the rule, (iii) at least one anomaly condition that is to be applied to the one or more identified streaming event queues, and (iv) at least one user that is to be "subscribed" to the rule so as to be notified when the rule results in an anomaly detection. Optionally, the rule may also include at least one filter condition that may be applied to the one or more streaming event queues before the rule is applied to the streaming events within those queues.

The basic information that may be included as part of a user-defined anomaly detection rule may take various forms. As one example, the basic information may include a user-defined name and perhaps also a user-defined description that provides context for the rule. In this respect, the interface for creating a user-defined anomaly detection rule may enable a user to input the basic information in various ways, including options for entering alphanumerical information into a text field. Other examples are also possible.

Further, the identification of one or more available streaming event queues that may be included as part of a user-defined anomaly detection rule may take various forms. As one example, the identification may comprise a queue identifier for each streaming event queue to which an anomaly condition is to be applied. As another example, the identification may comprise a queue name for each streaming event queue to which an anomaly condition is to be applied. Other examples are also possible.

Further yet, the at least one anomaly condition that that may be included as part of a user-defined anomaly detection rule may take various forms. In general, an anomaly condition may take the form of a logical expression that is to be applied to streaming events data in one or more streaming event queues and can be evaluated either as true (e.g., the condition is satisfied) or false (e.g., the condition is not satisfied), such as a logical expression that evaluates for the existence of a particular pattern in the streaming events data. In this respect, an anomaly condition may comprise one or more parameters that define (i) which subset of streaming events within the identified one or more streaming event queues are to be accessed for analysis, (ii) which one or more data fields of the streaming events are to be analyzed, and (iii) what form of data analysis is to be applied to the values included within the one or more data fields of the accessed subset of streaming events in order to determine whether those values satisfy the anomaly condition, among other possible parameters. Such an anomaly condition could take any of various different forms.

As one possible example, an anomaly condition may comprise an evaluation of whether the extent of some subset of streaming events accessed from a given streaming event queue (e.g., streaming events within a sliding time window of 30 minutes) that contain a certain value within a given textual data field (e.g., a particular name) satisfies a threshold extent. As another example, an anomaly condition may comprise an evaluation of whether a total or average value of a numerical data field across some subset of streaming events accessed from a given streaming event queue (e.g., streaming events within a sliding time window of 30 minutes), such as a total or average value of a numerical data field for monetary amount of a transaction, satisfies a threshold value. As yet another example, an anomaly condition may comprise an evaluation of whether certain data values of streaming events from different streaming event queues that are accessed because of their relationship to one another meet certain threshold criteria, such a threshold length of time between the time when one type of event occurred and the time when another event occurred. Numerous other examples are also possible as well, and in practice, the anomaly detection technology disclosed herein may be capable of leveraging any data analysis operation that is supported by the particular streaming query technology utilized by the anomaly rule execution subsystem 260 and is suitable for detecting some sort of anomalous pattern within the streaming events data.

In at least some implementations, it is also possible that a user-defined anomaly detection rule may include multiple anomaly conditions that connected by one or more logical operators, such as an AND or OR operator, in which case the determination of whether an anomaly exists may be based on an evaluation of these multiple anomaly conditions together.

In at least some implementations, instead of defining an anomaly condition as described above, a user could also alternatively upload a data science model that has been configured to detect anomalies in streaming events data (e.g., data science model created within a data science environment such as H2O, among other possibilities), in which case this data science model may take the place of the anomaly condition.

Still further, the at least one filter condition that may optionally be included as part of a user-defined anomaly detection rule may take the form of any one or more filter conditions that can be applied to the streaming events in the identified streaming event queue(s) in order to filter the streaming events before the anomaly condition is applied. Such a filter condition may take various forms. As one example, the filter condition may specify that the streaming events in the identified streaming event queue(s) should be filtered based on their value for a given data field (e.g., whether or not the streaming events include a particular textual value such as a particular card issuer name or whether or not the streaming events have a particular numerical value that falls above or below a threshold value) before the anomaly condition is applied. As another example, the filter condition may specify that the streaming events in the identified streaming event queue(s) should be filtered based on a particular period of time (e.g., a given date range) before the anomaly condition is applied. Other examples are possible as well.

Lastly, the identification of at least one subscribed user that may be included as part of a user-defined anomaly detection rule may take various forms. As a starting point, a user that is creating the anomaly-detection rule may be automatically identified as a subscribed user for that rule, such that the user will be notified if an anomaly based on the rule is detected. Additionally, the creating user may be able to input an identification of one or more other users that are to be subscribed to the rule to receive notifications about anomaly detections, in which case these one or more other users may each be identified as subscribed user for the rule. As part of this identification, the rule may also include information indicating how each subscribed user is to be notified. For example, the identification of a subscribed user may include an email address or a phone number at which the subscribed user is to be notified when the user-defined anomaly detection rule leads to an anomaly event. Other examples are also possible.

Figure 3:
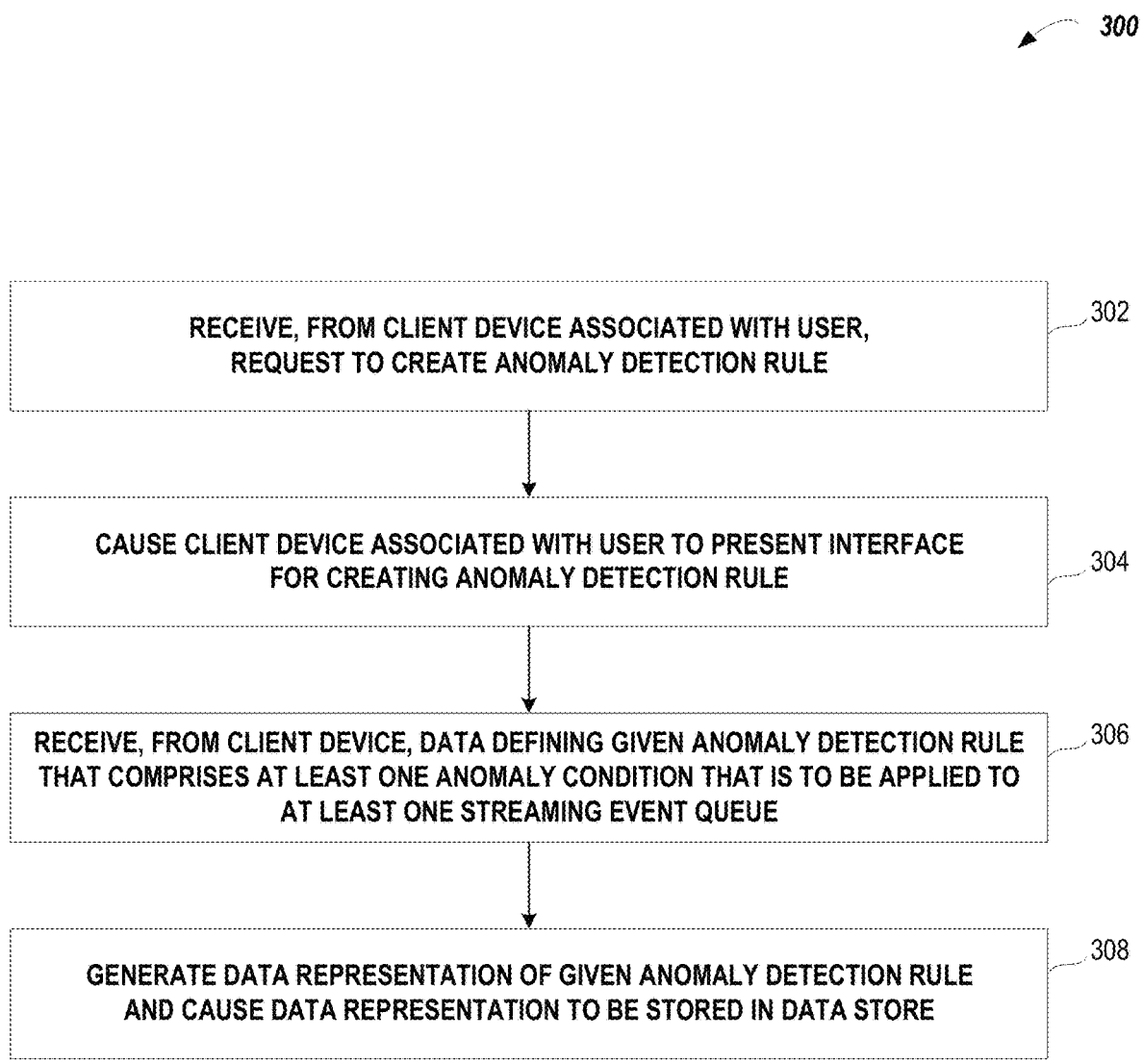
FIG. 3 depicts a flow diagram of an example process for creating a user-defined anomaly rule in accordance with the disclosed technology.

Turning now to FIG. 3, a flow diagram of an example process 300 that may be carried out by the computing platform 102 in order to facilitate creation of a user-defined anomaly detection rule is depicted. For purposes of illustration only, example process 300 is described as being carried out by the anomaly rule creation subsystem 240 of FIG. 2, but it should be understood that example process 300 may be carried out by functional subsystems that take other forms as well. Further, it should be understood that, in practice, these functions of the anomaly rule creation subsystem 240 may be encoded in the form of program instructions that are executable by one or more processors of the computing platform 102. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 3, the example process 300 may begin at 302 with the anomaly rule creation subsystem 240 receiving, from a client device, a user request to create a user-defined anomaly detection rule. In practice, a user associated with the organization operating the computing platform 102 may have used a client device such as a computer or smartphone that is configured to run software for accessing and interacting with the computing platform 102 to access the computing platform 102 and then navigate to an interface view to input a request for creating user-defined anomaly detection rules.

At 304, after receiving the user request to create a user-defined anomaly detection rule, the anomaly rule creation subsystem 240 may cause the client device to present an interface for creating user-defined anomaly detection rules. One possible example of an interface that may be presented by the anomaly rule creation subsystem 240 is shown in FIGS. 4A-4B.

FIG. 4A depicts an example interface view 400 that provides a set of options that enable the user to input information to build a user-defined anomaly detection rule. As shown, example interface view 400 includes a "Rule Name" field and "Description" field that enable the user to enter basic information about the rule, such as a rule name and a rule description. Additionally, the example interface view 400 also includes an "Alert Subscribers" field that enables the user to input information identifying one or more users who are to be notified if the rule leads to an anomaly event. In the example interface view 400, the interface presents these options for inputting information as a combination of text field options, whereby the user may select the field and input alphanumeric values for each field (e.g., as with the "Rule Name" and "Description" input fields), and a look-up/drop-down menu option, whereby the user may either input an alphanumeric value to search for potential values that may be used to populate the field or select an option to present a drop-down menu from which a value may be selected for input (e.g., as with the "Alert Subscribers" field). However, it should be understood that the interface may present these options in other ways as well.

Turning to FIG. 4B, another example interface view 410 is shown that includes various fields for inputting information that identifies the one or more streaming event queues and defines at least one anomaly condition that is to be applied to the one or more streaming event queues. For instance, as shown, example interface view 410 may include at least one "Streaming Event Queue" input field that enables the user to identify one or more streaming event queues that are available for inclusion in the user-defined anomaly detection rule. In turn, other fields of the example interface view 410 may enable the user to input information that defines (i) which subset of streaming events within the identified one or more streaming event queues are to be accessed for analysis, (ii) which one or more data fields of the streaming events are to be analyzed, and (iii) what form of data analysis is to be applied to the values included within the one or more data fields of the accessed subset of streaming events in order to determine whether those values satisfy the anomaly condition.

To illustrate with the specific example shown in FIG. 4B, the user has identified a streaming event queue called "Queue_123456A," and has then input information specifying that (i) the analysis is to be performed on streaming events in the identified streaming queue that fall within a sliding time window having a length of 30 minutes, (ii) the analysis is to be performed on the "ORGANIZATION_NAME" data field of the streaming events in the identified streaming queue, and (iii) the particular data analysis to be applied comprises an evaluation of whether the extent of streaming events within the defined sliding time window containing a value of "DISCOVER" for the "ORGANIZATION_NAME" data field is greater than a threshold of 20%. Many other examples are possible as well.

The anomaly rule creation subsystem 240 may cause the example interface view 410 to present the options for defining the parameters of the user-defined anomaly rule in various ways. As one possibility, the interface may include one or more text fields for receiving alphanumeric input. As another possibility, the interface may include one or more drop down menus or lists for receiving a selection input. As shown in FIG. 4A, the example interface view 410 includes a combination of different presentations of options for providing input defining the parameters of the user-defined anomaly rule. Other examples are also possible.

Further, the options included in the interface view may be combined in any number of ways to create an anomaly condition, including but not limited to any of the examples previously discussed.

As shown in FIG. 4B, the example interface view 400 may also include an option for the user to save the provided input, such as by selecting a GUI button to proceed "Next" or to "Save."

The options that are presented to a user when creating a new user-defined anomaly detection rule may be determined in various ways. As one possibility, before causing the user's client device to display an interface view for creating a new user-defined anomaly detection rule, the anomaly rule creation subsystem 240 may communicate with the streaming events subsystem 230 to access schema information to determine which streaming event queues are available. Based on that information, the anomaly rule creation subsystem 240 may determine a set of options that should be presented to the user for the streaming event queues and/or data fields, and then cause the user's client device to present that set of options via the interface.

As another possibility, the options that are presented to a user when creating a new user-defined anomaly detection rule could also be based on user permissions that have been assigned to the user, which could take the form of user-specific permissions or role-based permissions, among other possibilities. For example, in the context of FIG. 4B, the user's permissions could dictate which options are presented to the user for the streaming event queues and perhaps also which options are presented to the user for the data fields of streaming events within a selected streaming event queue, among other possibilities. The anomaly rule creation subsystem 240 may determine the options that should be presented to the user in other ways as well.

Returning to FIG. 3, in response to determining that a user has completed defining a new anomaly detection rule, the client device may transmit data defining the new anomaly detection rule that has been created by the user to the anomaly rule creation subsystem 240. In turn, at block 306, the anomaly rule creation subsystem 240 may receive the data defining the new anomaly detection rule.

Thereafter, at block 308, the anomaly rule creation subsystem 240 may generate a data representation of the user-defined anomaly detection rule and store that representation in the anomaly rule data store 250. The anomaly rule data store 250 may take various forms, examples of which may include a relational database, a columnar database, or a NoSQL database, among other possibilities. In practice, the data representation of the anomaly detection rule may comprise a data record that has a set of data fields that define the various elements of the user-defined anomaly detection rule, which may include the elements described above (e.g., rule name, rule description, identified queue(s), anomaly condition(s), filter condition(s), subscribing user(s), etc.) and perhaps also other data elements that were included in the data defining the anomaly-detection rule and/or generated by the anomaly rule creation subsystem 240. Examples of such other data elements may include a rule identifier, a timestamp indicating the date and time when the rule was created, and an identifier of the user that created the rule, among other possibilities.

After the anomaly rule creation subsystem 240 has caused the representation of the user-defined anomaly detection rule to be stored in the anomaly rule data store 250, it may cause the user's client device to present an interface view that includes a visualization of the user-defined anomaly detection rule. The interface view may enable the user to view the user-defined anomaly detection rule and perhaps also take one or more actions with respect to the user-defined anomaly rule, such as modifying the user-defined anomaly rule. Additionally, or alternatively, the anomaly rule creation subsystem 240 may present the interface to enable the user to view the user-defined anomaly detection rule or take one or more actions regarding the user-defined anomaly detection rule at a later time.

To illustrate with an example, FIG. 4C depicts an example interface view 420 comprising a visualization of a user-defined anomaly detection rule that may be presented to a user at some point in time after the user has created the user-defined anomaly detection rule and execution of the user-defined anomaly detection rule has begun. As shown, the example interface view 420 shows the various parameters of the user-defined anomaly detection rule that has been created by the user, including the rule name, rule description, time window length, % threshold, alert subscribers, and anomaly condition(s). Further, as shown, the example interface view 420 includes a list of "Anomalies" that have been detected while executing the user-defined anomaly detection rule, along with options for taking certain actions with respect to the user-defined anomaly detection rule. Many other examples are possible as well.

In general, the anomaly rule creation subsystem 240 may, at any time after a given user-defined anomaly detection rule has been created and stored, receive an indication of a user request to access a previously-created anomaly detection rule. For instance, a user (which may or may not be the same as the user who created the original anomaly detection rule) may direct a client device (which may be different from a client device that was accessed at the time of creating the anomaly rule) to access the software application that facilitates interaction with the computing platform 102 and thereby the anomaly rule creation subsystem 240. The user may then navigate to an interface for viewing and/or modifying the given user-defined anomaly detection rule. In this regard, the interface for viewing and/or modifying the given user-defined anomaly detection rule may be a part of the interface for creating anomaly detection rules or may be a separate interface provided by the anomaly rule creation subsystem 240. In turn, the computing platform 102 may cause the user's client device to present a view that includes a visualization of the given anomaly detection rule. Additionally, the view may include one or more options that enable the user to modify the given user-defined anomaly detection rule. For example, the view may include options to modify the basic information, one or more conditions, and/or one or more identified streaming event queues that are included in the given anomaly detection rule. The options to modify the given user-defined anomaly detection rule may be presented to the user in various ways, including the ways described above with respect to the anomaly rule creation subsystem 240 presenting an interface for creating a user-defined anomaly detection rule.

After receiving an indication that the user has completed inputting one or more modifications to the given user-defined anatomy detection rule, the client device may send data defining the one or more modifications to the anomaly rule creation subsystem 240. The anomaly rule creation subsystem 240 may then cause the data representation of the user-defined anatomy detection rule stored in the anomaly rule data store 250 to be updated in accordance with the modification(s).

Returning to FIG. 2, the anomaly rule execution subsystem 260 of the computing system 200 may generally be configured to perform functions that facilitate execution of the user-defined anomaly detection rules stored in the anomaly rule data store 250, examples of which may include (i) obtaining a stored data representation of a given user-defined anomaly detection rule from the anomaly rule data store 250, where the given user-defined anomaly detection rule defines at least one anomaly condition that is to be applied to one or more streaming event queues 234 of the streaming events subsystem 230, (ii) converting the stored data representation of the given user-defined anomaly detection rule to a streaming query statement (e.g., a KSQL or ksqlDB statement), (iii) iteratively applying the streaming query statement to the one or more streaming event queues, (iv) while iteratively applying the streaming query statement to the one or more streaming event queues, generating an "anomaly" type of streaming event (or an "anomaly event" for short) each time the streaming query statement is satisfied, and (v) writing at least a subset of the generated anomaly events to a streaming event queue 234 of the streaming events subsystem 230 that is designated for anomaly events, which is shown in FIG. 2 as streaming event queue 234x. However, it should be understood that the anomaly rule execution subsystem 260 may perform various other functions as well.

In order to facilitate the foregoing functionality, the anomaly rule execution subsystem 260 may take any of various forms, including but not limited to the possibility that the anomaly rule execution subsystem 260 may include a streaming query engine (e.g., a KSQL or ksqlDB) engine that is responsible for the functions of iteratively applying the streaming query statement to the one or more streaming event queues and generating the anomaly events when the streaming query statement is satisfied.

Figure 5:
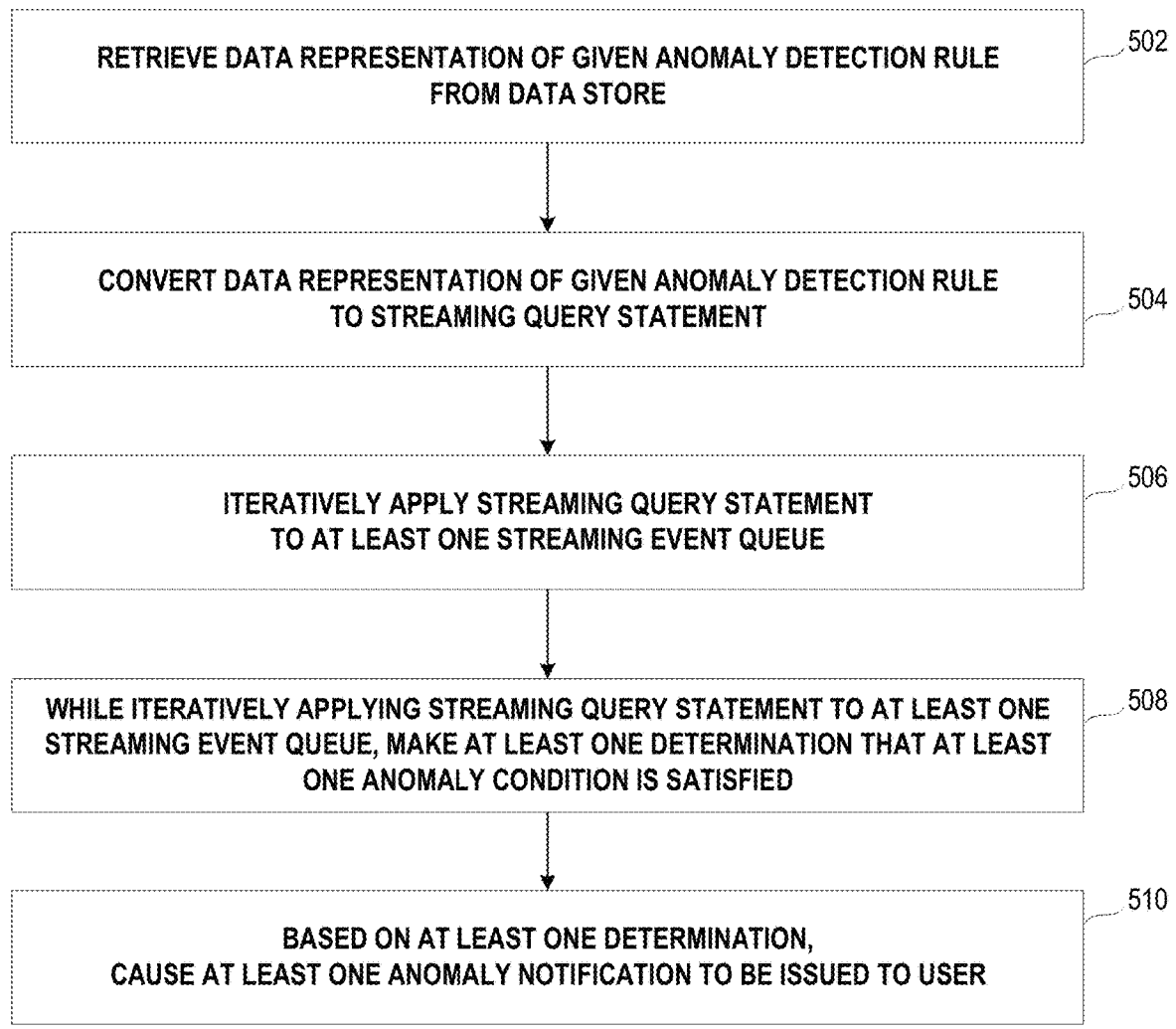
FIG. 5 depicts a flow diagram of an example process for executing a user-defined anomaly rule in accordance with the disclosed technology.

Turning now to FIG. 5, a flow diagram of an example process 500 that may be carried out by the computing platform 102 in order to execute a user-defined anomaly detection rule. For purposes of illustration only, example process 500 is described as being carried out by the anomaly rule execution subsystem 260 of FIG. 2, but it should be understood that example process 500 may be carried out by functional subsystems that take other forms as well. Further, it should be understood that, in practice, these functions of the anomaly rule execution subsystem 260 may be encoded in the form of program instructions that are executable by one or more processors of the computing platform 102. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 5, the example process 500 may begin at 502 with the anomaly rule execution subsystem 260 retrieving a stored data representation of a given user-defined anomaly detection rule from the anomaly rule data store 250, where the given user-defined anomaly detection rule defines an anomaly condition that is to be applied to one or more streaming event queues 234 of the streaming events subsystem 230. This anomaly condition could take any of the various different forms discussed above. In practice, the anomaly rule execution subsystem 260 may perform this function in response to detecting that the given user-defined anomaly detection rule has been newly created and is available for execution (e.g., by detecting a new entry in the anomaly rule data store 250), although the anomaly rule execution subsystem 260 may retrieve the stored data representation of the given user-defined anomaly detection rule from the anomaly rule data store 250 at other times and/or in response to other triggers as well.

At block 504, after obtaining the stored data representation of a given user-defined anomaly detection rule, the anomaly rule execution subsystem 260 may convert the stored data representation of the given user-defined anomaly detection rule to a streaming query statement, such as a KSQL or ksqlDB statement for running iterative queries on Kafka topics. This function of converting the stored data representation of the given user-defined anomaly detection rule to the streaming query statement may take various forms, which may depend at least in part on the format of the stored data representation, the format of the streaming query statement that is to be applied to the one or more streaming event queues, and perhaps also the schema(s) of the one or more streaming event queues. In this respect, in at least some implementations, the anomaly rule execution subsystem 260 may obtain the schema(s) of the one or more streaming event queues from the schema registry 232 as part of the function of converting the stored data representation of the given user-defined anomaly detection rule to the streaming query statement.

At block 506, after converting the stored data representation of the given user-defined anomaly detection rule to the streaming query statement, the anomaly rule execution subsystem 260 may begin to iteratively apply the streaming query statement to the one or more streaming event queues in order to evaluate whether the anomaly condition of the given user-defined anomaly detection rule is satisfied. As noted above, in at least some implementations, this function may be carried out by a streaming query engine such as a KSQL or ksqlDB engine that is included within the anomaly rule execution subsystem 260, although other implementations are possible as well.

During each iteration of the streaming query, the anomaly rule execution subsystem 260 may apply the streaming query statement to the one or more streaming event queues in order to determine whether or not the anomaly condition of the given user-defined anomaly detection rule is satisfied. This functionality may take various forms, which may depend in part on the anomaly condition of the given user-defined anomaly detection that serves as the basis for the streaming query statement.

In at least some implementations, this functionality may begin with the anomaly rule execution subsystem 260 accessing some subset of streaming events contained within the one or more streaming event queues that are to be evaluated during a given iteration of the streaming query. In this respect, the particular subset of streaming events that are accessed within each of the one or more queues may depend on the specifics of the anomaly condition. For example, as noted above, an anomaly condition could specify a particular window of time that is used to determine which streaming events to access within a streaming event queue. As another example, as noted above, an anomaly condition could specify a particular relationship between streaming events in different streaming event queues that is used to determine which streaming events to access across different streaming event queues. Many other examples are possible as well. Further, in practice, this functionality of accessing the subset of streaming events that are contained within the one or more streaming event queues may involve use of the schema(s) for the one or more streaming event queues that are stored in the schema registry 232 in order to interpret and parse the streaming events contained within the one or more streaming event queues. Further yet, in some cases, this functionality of accessing the subset of streaming events that are contained within the one or more streaming event queues may involve filtering the streaming events based on certain filter conditions included within the user-defined anomaly detection rule.

After accessing the subset of streaming events that are to be evaluated during a given iteration of the streaming query statement, the anomaly rule execution subsystem 260 may then perform some form of data analysis on the values included within the subset of streaming events in order to determine whether those values satisfy the anomaly condition that is encoded within the streaming query statement, which may take any of various forms depending on the specifics of the anomaly condition. For instance, as described above, this data analysis may involve operations such as evaluating whether the extent of the accessed streaming events that contain a certain value within a given textual data field (e.g., a particular name) satisfies a threshold, evaluating whether a total or average value of a numerical data field across the accessed streaming events (e.g., the total or average monetary amount of a window of transactions) satisfies a threshold, and/or evaluating whether certain data values of streaming events that are accessed because of their relationship to one another meet certain threshold criteria (e.g., a threshold length of time between the occurrence of two related transactions), among various other possibilities.

The functionality of applying the streaming query statement to the one or more streaming event queues in order to determine whether or not the anomaly condition of the given user-defined anomaly detection rule is satisfied may take various other forms as well, and in practice, may be capable of leveraging any data analysis operation that is supported by the particular streaming query technology utilized by the anomaly rule execution subsystem 260.

Further, the frequency with which the anomaly rule execution subsystem 260 iteratively applies the streaming query statement to the one or more streaming event queues may take various forms and may be defined in various manners. As one possibility, the anomaly rule execution subsystem 260 may be configured to iteratively apply the streaming query statement according to a predefined frequency that serves as a default frequency for execution of all user-defined anomaly detection rule, which may be set by an administrative user of the computing platform 102 (among other possibilities). As another possibility, the anomaly rule execution subsystem 260 may be configured to iteratively apply the streaming query statement according to a frequency that is defined based on certain information in the stored data representation of the given user-defined anomaly detection rule (e.g., the type of condition being applied or the length of the time window to be evaluated). For example, if the given user-defined anomaly detection rule specifies a sliding time window length of 30 minutes, then the anomaly rule execution subsystem 260 may function to apply the streaming query statement every 30 minutes, although it should be understood that the anomaly rule execution subsystem 260 could also function to apply the streaming query statement using a faster or slower frequency. Other implementations are possible as well.

At block 508, while iteratively applying the streaming query statement to the one or more streaming event queues, the anomaly rule execution subsystem 260 may generate an anomaly event each time the streaming query statement is satisfied. As with other streaming events, each such anomaly event may include data for some defined set of data fields, examples of which may include an identifier of the given user-defined anomaly detection rule that detected the anomaly represented by the anomaly event (perhaps along with other information about the rule), an indication of the date/time when the anomaly was detected, an indication of the type of anomaly represented by the anomaly event, and/or other information about the streaming event data that gave rise to the anomaly (e.g., the particular time window of streaming events that gave rise to the anomaly, the relevant metrics that led to the anomaly detection, etc.), among other possibilities.

Lastly, at block 510, the anomaly rule execution subsystem 260 may write at least a subset of the generated anomaly events to the streaming event queue 234$x$ of the streaming events subsystem 230, which is designated for anomaly events. This functionality may take various forms.

According to one implementation, the anomaly rule execution subsystem 260 may be configured to write each and every generated anomaly event to the streaming event queue 234x of the streaming events subsystem 230 by default, without performing any further analysis of the anomaly event. In such an implementation, the anomaly rule execution subsystem 260 will preferably be configured to write each anomaly event to the streaming event queue 234x of the streaming events subsystem 230 immediately after the anomaly event is generated (or at least as quickly as possible after generation) so as to accelerate the issuance of anomaly notifications based on the anomaly event, although other approaches are possible as well.

According to another implementation, the anomaly rule execution subsystem 260 may be configured to selectively determine whether or not to write each generated anomaly event to the streaming event queue 234x of the streaming events subsystem 230 based on one or more factors, which may take various forms. For example, the anomaly rule execution subsystem 260 may selectively determine whether or not to write a generated anomaly event to the streaming event queue 234x of the streaming events subsystem 230 based on the amount of time that has elapsed since the last anomaly event associated with given user-defined anomaly detection rule was written to the streaming event queue 234x, in which case the generated anomaly event may be written to the streaming event queue 234x if the elapsed time exceeds some threshold. As another example, the anomaly rule execution subsystem 260 may selectively determine whether or not to write a generated anomaly event to the streaming event queue 234x of the streaming events subsystem 230 based on whether an anomaly of the type represented by the generated anomaly event is currently undergoing remediation. Many other examples are possible.

Further, while FIG. 2 shows one example streaming event queue 234x that is designated for anomaly events, it should be understood that streaming events subsystem 230 may include either a single, global streaming event queue that is designated for all anomaly events that are generated by the anomaly rule execution subsystem 260 or multiple different streaming event queues that are designated for different subsets of anomaly events (e.g., different streaming event queues corresponding to different categories user-defined anomaly detection rules stored).

The anomaly rule execution subsystem 260 of the computing platform 102 may also be configured to execute user-defined anomaly detection rules that take other forms. For instance, in some implementations, the anomaly rule creation subsystem 240 may enable a user to upload a data science model that is to be used as an anomaly detection rule. In such implementations, the anomaly rule execution subsystem 260 may then be configured to deploy the data science model into a deployment environment, iteratively run the data science model on streaming events within one or more streaming event queues, generate an anomaly event each time the data science model's output indicates that an anomaly has been detected, and then write at least a portion of the generated anomaly events to the streaming event queue 234x of the streaming events subsystem 230. The anomaly rule execution subsystem 260 may be capable of executing user-defined anomaly detection rules that take other forms as well.

Notably, the anomaly rule execution subsystem 260 is one of the functional subsystems of the computing platform 102 that serves as a consumer of the streaming events contained within the streaming event queues 234 of the streaming events subsystem 230, and may be configured to utilize any of various different data fields within those streaming events depending on the user-defined anomaly detection rules that have been created and are being executed by the anomaly rule execution subsystem 260. In this respect, the anomaly rule execution subsystem 260 could be exposed to the risk of malfunction if any one or more of the schemas in the schema registry 232 were to be updated to remove a data field being utilized by the anomaly rule execution subsystem 260. However, as discussed above, the streaming events subsystem 230 disclosed herein may avoid this problem by selectively determining whether or not to update the schemas within the schema registry 232 depending on whether the schema update being sought involves a removal of a data field. In this respect, the streaming events subsystem 230 may decline to implement a schema update that would remove a data field so as to avoid updating schemas in a way that will cause the anomaly rule execution subsystem 260 to malfunction (in which case future streaming events may include null values for the data field that was to be removed), while the streaming events subsystem 230 may allow schema updates that involve additions of data fields given that these updates will not disrupt the functionality of the anomaly rule execution subsystem 260.

Referring again to FIG. 2, the anomaly notification subsystem 270 of the computing platform 102 may generally function to read anomaly events from the streaming event queue 234x of the streaming events subsystem 230, and then for each respective anomaly event that is read from the streaming event queue 234x, (i) determine one or more anomaly notifications that are to be issued based on the respective anomaly event and (ii) cause the one or more anomaly notifications to be issued. This functionality may take various forms.

For instance, in order to determine one or more anomaly notifications that are to be issued based on a given anomaly event, the anomaly notification subsystem 270 may first reference the data contained within the anomaly event (e.g., the rule identifier) in order to identify the user-defined anomaly detection rule that led to the generation of the given anomaly event. After identifying that user-defined anomaly detection rule, the anomaly notification subsystem 270 may next access the stored representation of the user-defined anomaly detection rule from the anomaly rule data store 250, which may include information specifying (i) which one or more users are subscribed to receive notifications when the user-defined anomaly detection rule leads to the detection of an anomaly and (ii) how to issue an anomaly notification to each of the one or more users (e.g., email, text, etc.). Based on that information, the anomaly notification subsystem 270 may identify each user that is to be issued an anomaly notification based on the given anomaly event along with a means for issuing an anomaly notification to each such user.

In most instances, the one or more users that are subscribed to receive notifications when the user-defined anomaly detection rule leads to the detection of an anomaly may comprise one or more individuals who work for or with the organization that operates the computing platform 102 (e.g., employees of a financial institution) and have an appropriate level of permissions to receive such notifications. However, in other instances, the one or more users that are subscribed to receive notifications when the user-defined anomaly detection rule leads to the detection of an anomaly may include one or more individuals who do not work for or with the organization that operates the computing platform 102, but have nevertheless been granted an appropriate level of permissions for receiving anomaly notifications (e.g., a particular customer of the organization).

The function of causing the one or more anomaly notifications to be issued may also take various forms. As one possibility, the anomaly notification subsystem 270 may cause an email notification to be sent to an email address associated with an identified user (e.g., by communicating with an SMTP server). As another possibility, the anomaly notification subsystem 270 may cause a message notification (e.g., a Short Message Service "SMS" notification) to be sent to a phone number associated with an identified user. As yet another possibility, the anomaly notification subsystem 270 may cause a notification to be displayed via a user interface associated with the computing platform 102 that is accessible by an identified user, such as a "Dashboard" interface view that is accessible by the user. As still another possibility, the anomaly notification subsystem 270 may interact with a digital workflow management software tool provided by a third-party organization (e.g., ServiceNow) and used by the computing platform 102 to cause the third-party service to generate a ticket for the anomaly that is then placed in a ticket queue associated with an identified user. Other possibilities may also exist.

In the ways described above, the disclosed software technology provides an improved user experience for creation and management of user-defined rules for detecting anomalies in source data that is ingested and/or generated by a computing platform, carries out nearly real-time anomaly detection using the user-defined rules, and issues notifications to users in a nearly real-time manner after the anomalies have been detected, among other beneficial features of the disclosed software technology.

Figure 6:
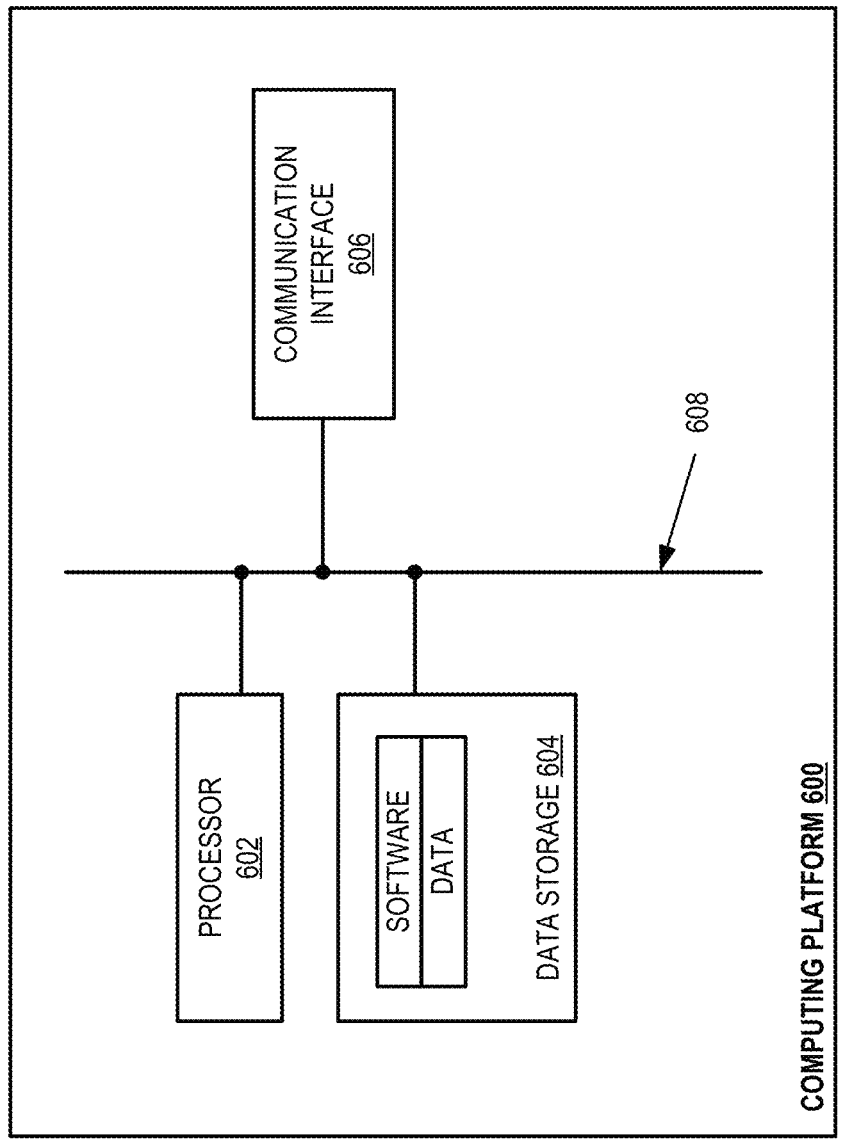
FIG. 6 depicts example structural components of an example computing platform.

Turning now to FIG. 6, a simplified block diagram is provided to illustrate some structural components that may be included in an example computing platform 600, which may be configured to host and execute the new software technology disclosed herein. At a high level, the computing platform 600 may generally comprise any one or more computing systems that collectively include at least a processor 602, data storage 604, and a communication interface 606, all of which may be communicatively linked by a communication link 608 that may take the form of a system bus, a communication network such as a public, private, or hybrid cloud, or some other connection mechanism. Each of these components may take various forms.

Processor 602 may comprise one or more processing components, such as general-purpose processors (e.g., a single- or a multi-core central processing unit (CPU)), special-purpose processors (e.g., a graphics processing unit (GPU), application-specific integrated circuit, or digital-signal processor), programmable logic devices (e.g., a field programmable gate array), controllers (e.g., microcontrollers), and/or any other processor components now known or later developed. In line with the discussion above, it should also be understood that processor 602 could comprise processing components that are distributed across a plurality of physical computing devices connected via a network, such as a computing cluster of a public, private, or hybrid cloud.

In turn, data storage 604 may comprise one or more non-transitory computer-readable storage mediums that are collectively configured to store (i) program instructions that are executable by processor 602 such that computing platform 600 is configured to perform certain functions in connection with providing services for interacting with user accounts, and (ii) data that may be received, derived, or otherwise stored, for example, in one or more databases, file systems, repositories, or the like, by computing platform 600, in connection with providing services for interacting with user accounts. In this respect, the one or more non-transitory computer-readable storage mediums of data storage 604 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 604 may comprise computer-readable storage mediums that are distributed across a plurality of physical computing devices connected via a network, such as a storage cluster of a public, private, or hybrid cloud. Data storage 604 may take other forms and/or store data in other manners as well.

Communication interface 606 may be configured to facilitate wireless and/or wired communication with client devices (e.g., one or more client devices 108 of FIG. 1) and/or third-party computing platforms. Additionally, in an implementation where the computing platform 600 comprises a plurality of physical computing devices connected via a network, communication interface 606 may be configured to facilitate wireless and/or wired communication between these physical computing devices (e.g., between computing and storage clusters in a cloud network). As such, communication interface 606 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

Although not shown, the computing platform 600 may additionally include or have an interface for connecting to one or more user-interface components that facilitate user interaction with the computing platform 600, such as a keyboard, a mouse, a trackpad, a display screen, a touch-sensitive interface, a stylus, a virtual-reality headset, and/or one or more speaker components, among other possibilities.

It should be understood that the computing platform 600 is one example of a computing platform that may be used with the embodiments described herein. Numerous other arrangements are possible and contemplated herein. For instance, in other embodiments, the computing platform 600 may include additional components not pictured and/or more or fewer of the pictured components.

Figure 7:
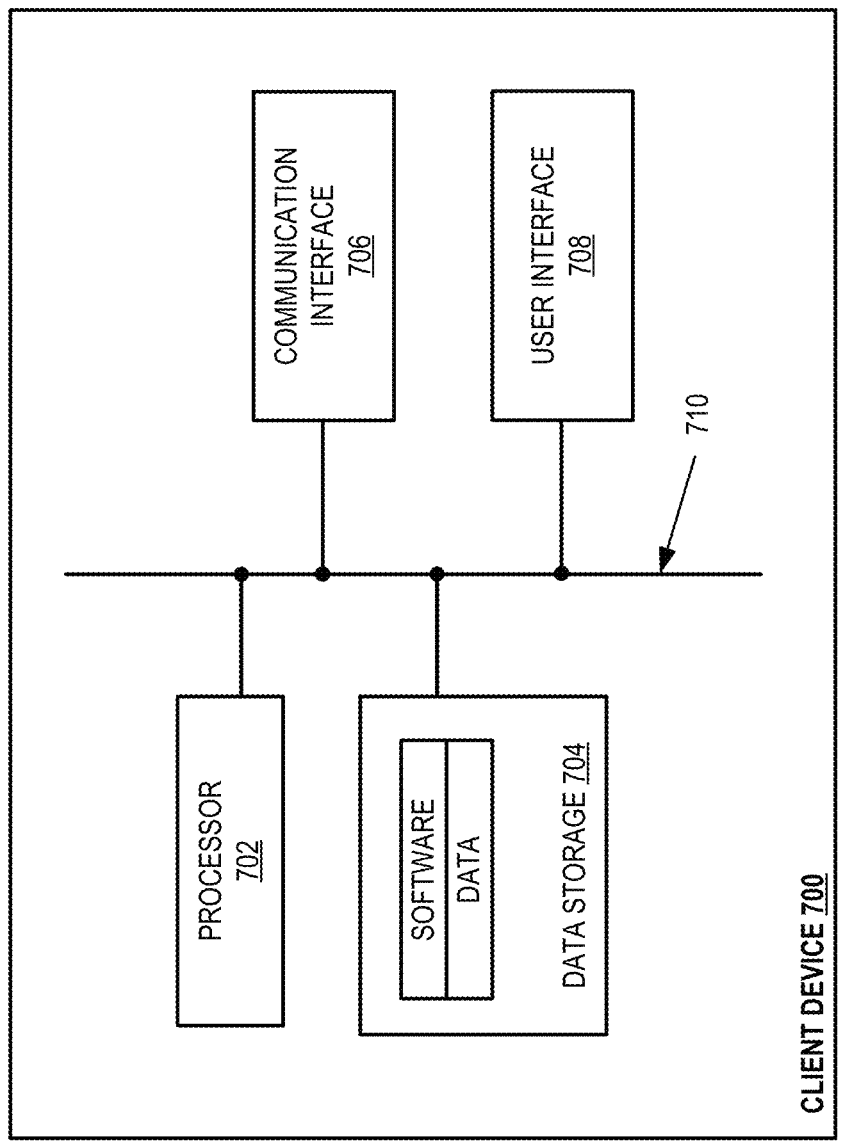
FIG. 7 depicts example structural components of an example client device.

Turning next to FIG. 7, a simplified block diagram is provided to illustrate some structural components that may be included in an example client device 700 that may access and communicate with a computing platform that is configured to host and execute the new software technology disclosed herein, such as the computing platform 102 of FIG. 2 or the computing platform 600 of FIG. 6. As shown in FIG. 7, the client device 700 may include at least a processor 702, data storage 704, a communication interface 706, and a user interface 708, all of which may be communicatively linked by a communication link 710 that may take the form of a system bus, a communication network such as a public, private, or hybrid cloud, or some other connection mechanism.

Processor 702 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed. In line with the discussion above, it should also be understood that processor 702 could comprise processing components that are distributed across a plurality of physical computing devices connected via a network, such as a computing cluster of a public, private, or hybrid cloud.

In turn, data storage 704 may comprise one or more non-transitory computer-readable storage mediums that are collectively configured to store (i) program instructions that are executable by processor 702 such that the client device 700 is configured to perform certain functions related to interacting with and accessing services provided by a computing platform, and (ii) data that may be received, derived, or otherwise stored, for example, in one or more databases, file systems, repositories, or the like, by the client device 700, related to interacting with and accessing services provided by a computing platform. In this respect, the one or more non-transitory computer-readable storage mediums of data storage 704 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 704 may comprise computer-readable storage mediums that are distributed across a plurality of physical computing devices connected via a network, such as a storage cluster of a public, private, or hybrid cloud. Data storage 704 may take other forms and/or store data in other manners as well.

Communication interface 706 may be configured to facilitate wireless and/or wired communication with other computing devices. Communication interface 706 may take any of various forms, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

The client device 700 may additionally include a user interface 708 for connecting to one or more user-interface components that facilitate user interaction with the client device 700, such as a keyboard, a mouse, a trackpad, a display screen, a touch-sensitive interface, a stylus, a virtual-reality headset, and/or one or more speaker components, among other possibilities.

It should be understood that the client device 700 is one example of a client device that may be used to interact with an example computing platform as described herein. Numerous other arrangements are possible and contemplated herein. For instance, in other embodiments, the client device 700 may include additional components not pictured and/or more or fewer of the pictured components.

Example embodiments of the disclosed innovations have been described above. Those skilled in the art will understand, however, that changes and modifications may be made to the embodiments described without departing from the true scope and spirit of the present invention, which will be defined by the claims. For instance, those in the art will understand that the disclosed technology for creating and executing user-customized workflows may be implemented in areas other than financial accounts.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing platform comprising:
   at least one processor;
   at least one non-transitory computer-readable medium; and
   program instructions stored on the at least one non-transitory computer-readable medium that, when executed by the at least one processor, cause the computing platform to:
   monitor one or more source datasets for changes, wherein the one or more source datasets comprise a plurality of data records;
   while monitoring the one or more source datasets for changes, detect changes to the one or more source datasets;
   based on the detected changes, generate streaming events that each represents a respective change related to a respective data record within the one or more source datasets and each contains data that corresponds to underlying data contained within the respective data record;
   populate the generated streaming events into one or more streaming event queues;
   retrieve an anomaly detection rule that comprises at least one anomaly condition;
   convert the anomaly detection rule to a streaming query statement;
   apply, in a near real-time manner, the streaming query statement to at least one streaming event queue of the one or more streaming event queues;
   while applying the streaming query statement to the at least one streaming event queue, make at least one determination that the at least one anomaly condition is satisfied; and
   based on the at least one determination, cause at least one anomaly notification to be issued to a user.

2. The computing platform of claim 1, wherein the at least one anomaly condition comprises parameters that define (i) a subset of streaming events within the at least one streaming event queue on which data analysis is to be performed, (ii) one or more data fields of the subset of streaming events on which data analysis is to be performed, and (iii) a form of data analysis that is to be performed on values of one or more data fields of the subset of streaming events.

3. The computing platform of claim 1, wherein the at least one anomaly condition comprises an evaluation of whether an extent of a given subset of streaming events that contain a given value of a given data field satisfies a threshold extent.

4. The computing platform of claim 1, wherein the at least one anomaly condition comprises an evaluation of whether a total or average value of a numerical data field across a given subset of streaming events satisfies a threshold value.

5. The computing platform of claim 1, wherein the at least one anomaly condition comprises an evaluation of whether certain data values across given subsets of streaming events from two or more streaming event queues that have a particular relationship meet a certain threshold criteria.

6. The computing platform of claim 1, wherein the anomaly detection rule further comprises at least one filter that is to be applied to the at least one streaming event queue before the at least one anomaly condition is applied.

7. The computing platform of claim 1, wherein the program instructions stored on the at least one non-transitory computer-readable medium that, when executed by the at least one processor, cause the computing platform to cause the at least one anomaly notification to be issued to the user further comprise program instructions stored on the at least one non-transitory computer-readable medium that, when executed by the at least one processor, cause the computing platform to:
  generate an anomaly event;
  write the generated anomaly event to a given streaming event queue that is designated for anomaly events; and
  based on the anomaly event and a data representation of the anomaly detection rule, generate a notification that is to be issued to the user.

8. The computing platform of claim 1, wherein the computing platform maintains a schema for the at least one streaming event queue, and wherein the computing platform further comprises program instructions stored on the at least one non-transitory computer-readable medium that, when executed by the at least one processor, cause the computing platform to:
  detect a request to update the schema;
  determine that the request to update the schema involves removal of a data field; and
  based on determining that the request to update the schema involves removal of the data field, decline to update the schema.

9. The computing platform of claim 1, further comprising program instructions stored on the at least one non-transitory computer-readable medium that, when executed by the at least one processor, cause the computing platform to:
  before retrieving the anomaly detection rule:
    cause a client device associated with a user to present an interface for creating an anomaly detection rule;
    receive, from the client device, data defining the anomaly detection rule, wherein the received data is based on user input provided via the interface; and
    store a data representation of the anomaly detection rule.

10. The computing platform of claim 1, wherein the one or more source datasets are monitored and the changes to the one or more source datasets are detected utilizing a change data capture (CDC) engine.

11. The computing platform of claim 1, wherein the streaming query statement comprises a KSQL or ksqlDB statement.

12. A non-transitory computer-readable medium, wherein the non-transitory computer-readable medium is provisioned with program instructions that, when executed by at least one processor, cause a computing platform to:
  monitor one or more source datasets for changes, wherein the one or more source datasets comprise a plurality of data records;
  while monitoring the one or more source datasets for changes, detect changes to the one or more source datasets;
  based on the detected changes, generate streaming events that each represents a respective change related to a respective data record within the one or more source datasets and each contains data that corresponds to underlying data contained within the respective data record;
  populate the generated streaming events into one or more streaming event queues;
  retrieve an anomaly detection rule that comprises at least one anomaly condition;
  convert the anomaly detection rule to a streaming query statement;
  apply, in a near real-time manner, the streaming query statement to at least one streaming event queue of the one or more streaming event queues;
  while applying the streaming query statement to the at least one streaming event queue, make at least one determination that the at least one anomaly condition is satisfied; and
  based on the at least one determination, cause at least one anomaly notification to be issued to a user.

13. The non-transitory computer-readable medium of claim 12, wherein the at least one anomaly condition comprises parameters that define (i) a subset of streaming events within the at least one streaming event queue on which data analysis is to be performed, (ii) one or more data fields of the subset of streaming events on which data analysis is to be performed, and (iii) a form of data analysis that is to be performed on values of one or more data fields of the subset of streaming events.

14. The non-transitory computer-readable medium of claim 12, wherein the at least one anomaly condition comprises one of (i) an evaluation of whether an extent of a given subset of streaming events that contain a given value of a given data field satisfies a threshold extent, (ii) an evaluation of whether a total or average value of a numerical data field across a given subset of streaming events satisfies a threshold value, or (iii) an evaluation of whether certain data values across given subsets of streaming events from two or more streaming event queues that have a particular relationship meet a certain threshold criteria.

15. The non-transitory computer-readable medium of claim 12, wherein the program instructions stored on the non-transitory computer-readable medium that, when executed by at least one processor, cause the computing platform to cause the at least one anomaly notification to be issued to the user further comprise program instructions that, when executed by at least one processor, cause the computing platform to:
  generate an anomaly event;
  write the generated anomaly event to a given streaming event queue that is designated for anomaly events; and
  based on the anomaly event and a data representation of the anomaly detection rule, generate a notification that is to be issued to the user.

16. The non-transitory computer-readable medium of claim 12, wherein the non-transitory computer-readable medium is further provisioned with program instructions that, when executed by at least one processor, cause the computing platform to:
  detect a request to update a schema being maintained by the computing platform for the at least one streaming event queue;
  determine that the request to update the schema involves removal of a data field; and
  based on determining that the request to update the schema involves removal of the data field, decline to update the schema.

17. The non-transitory computer-readable medium of claim 12, wherein the non-transitory computer-readable medium is further provisioned with program instructions that, when executed by at least one processor, cause the computing platform to:
  before retrieving the anomaly detection rule:
    cause a client device associated with a user to present an interface for creating an anomaly detection rule;
    receive, from the client device, data defining the anomaly detection rule, wherein the received data is based on user input provided via the interface; and
    store a data representation of the anomaly detection rule.

18. The non-transitory computer-readable medium of claim 12, wherein the one or more source datasets are monitored and the changes to the one or more source datasets are detected utilizing a change data capture (CDC) engine.

19. The non-transitory computer-readable medium of claim 12, wherein the streaming query statement comprises a KSQL or ksqlDB statement.

20. A method carried out by a computing platform, the method comprising:
- monitoring one or more source datasets for changes, wherein the one or more source datasets comprise a plurality of data records;
- while monitoring the one or more source datasets for changes, detecting changes to the one or more source datasets;
- based on the detected changes, generating streaming events that each represents a respective change related to a respective data record within the one or more source datasets and each contains data that corresponds to underlying data contained within the respective data record;
- populating the generated streaming events into one or more streaming event queues;
- retrieving an anomaly detection rule that comprises at least one anomaly condition;
- converting the anomaly detection rule to a streaming query statement;
- applying, in a near real-time manner, the streaming query statement to at least one streaming event queue of the one or more streaming event queues;
- while applying the streaming query statement to the at least one streaming event queue, making at least one determination that the at least one anomaly condition is satisfied; and
- based on the at least one determination, causing at least one anomaly notification to be issued to a user.

* * * * *